United States Patent [19]

Wright

[11] Patent Number: 4,935,066

[45] Date of Patent: Jun. 19, 1990

[54] PROCESS FOR DECOMPOSING BAKED-ON GREASE OR OIL

[76] Inventor: C. E. Wright, 1900 Maple Rd., Williamsville, N.Y. 14221

[21] Appl. No.: 157,974

[22] Filed: Feb. 19, 1988

[51] Int. Cl.$^5$ .............................................. B08B 3/04
[52] U.S. Cl. ...................................... 134/40; 134/30; 134/35; 252/117; 252/118
[58] Field of Search .................... 134/30, 35, 40, 3; 252/117, 118

[56] References Cited

U.S. PATENT DOCUMENTS

| | | | |
|---|---|---|---|
| 2,156,863 | 5/1939 | Mills | 260/415 |
| 2,801,257 | 7/1957 | Lawrence et al. | 260/415 |
| 2,895,975 | 7/1959 | Ives et al. | 260/415 |
| 3,841,909 | 10/1974 | Nonaka et al. | 134/5 |
| 3,923,541 | 12/1975 | Healy | 134/35 |
| 4,704,225 | 11/1987 | Stoufer | 134/40 |

FOREIGN PATENT DOCUMENTS 140475  3/1980  Fed. Rep. of Germany ........ 134/40

*Primary Examiner*—Asok Pal
*Attorney, Agent, or Firm*—Gravely, Lieder & Woodruff

[57] ABSTRACT

A method of removing baked-on grease and oil from substrates such as kitchen pots, exhaust hood filters, etc. using high pressure and temperatures followed by the use of oleic acid as a non-hazardous solvent. The parts are treated in a pressure vessel.

6 Claims, 1 Drawing Sheet

PROCESS FOR DECOMPOSING BAKED-ON GREASE OR OIL

BACKGROUND OF THE INVENTION

A need exists for a safe efficient method of cleaning baked-on grease or oil deposits from kitchen pots and pans, exhaust hood grease filters, burner trim rings, internal combustion engine parts, etc.

Most oils and greases when exposed to heat and air for extended periods undergo polymerization. The molecules become more complex and their properties may be radically different from those of their parents. Usually, the new compounds are more viscous, often approaching solids. An example is the brown or black baked-on materials which plague kitchen pots and pans and defy detergents and most solvents. Hand scouring has been the historically accepted treatment for these problems. Another example is exhaust hood grease filters, especially those above fry pots in restaurants. Here, hand scouring is not practical, even for baffle-type filters, much less mesh types.

The harder baked-on deposits are immune to soaps, detergents, and mundane solvents, such as alcohols, kerosene, xylene, toluene, benzene, acetone, and perchloroethylene. They are even totally resistant to strong bases, such as concentrated sodium or calcium hydroxide. A few unusual solvents have been found effective in removing the harder deposits but all must be considered hazardous. For example, concentrated sulfuric acid will decompose them, thereby allowing other solvents and detergents to complete the removal, but in the acid process very obnoxious fumes are evolved (probably acrolein, which is extremely toxic and reactive). Also, the acid itself is hazardous to use, metals are affected, and the acid containing residues are a waste disposal problem. Dry heat in excess of 300° C., as experienced in an inert gas atmosphere (including superheated steam as a dry inert gas), will also decompose the deposits, but the evolved gases contain considerable acrolein.

Some of the unusual solvents are also hazardous to substrate materials. They cause discoloration or deterioration. There are similar undesirable results with high temperature burning of the deposits, such as the 900° F., or so, used in self-cleaning type kitchen ovens. These temperatures also generate hazardous gases as the deposits decompose.

Accordingly, a principal object of this invention is to provide a process for safely removing baked-on grease or oil formations from metallic, ceramic or heat resistant plastic substrates.

Another principal object is to provide a process for cleaning filters used in restaurant hood assemblies.

Still another object is to provide a method of removing baked-on vegetable, mineral and animal fats and oils from metal, ceramic or synthetic substrates without the generation of hazardous gases.

These and other objects and advantages will become apparent hereinafter.

SUMMARY OF THE INVENTION

The present invention relates to a process for removing baked-on oil and grease from metal, ceramic or heat resistant plastic surfaces by immersing the objects in hot pressurized water in a pressure vessel for a predetermined period of time sufficient to decompose the deposits into components which can be removed by treating with low hazard solvents.

The term "low hazard solvent" as used herein is intended to denote a solvent which will not be hazardous to personnel in the area where the method is carried out. The solvent should be of such a nature as to be nonexplosive, nonflammable and should not be toxic to human beings in either the liquid or gaseous state. Furthermore, the solvent should not cause any damage to the parts being treated by the method.

The invention also consists in the parts and in the arrangements and combinations of parts hereinafter described and claimed.

In the accompanying drawings which form part of the specification and wherein like numerals and letters refer to like parts wherever they occur.

DETAILED DESCRIPTION

Figure 1:
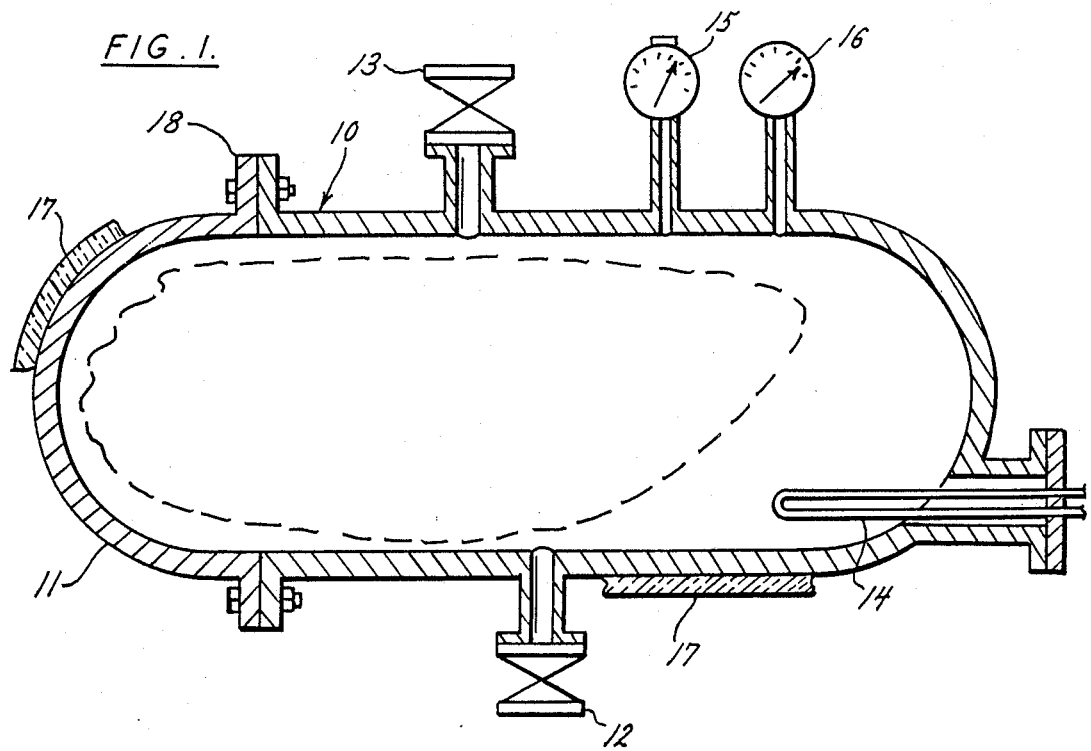
FIG. 1 is a fragmentary vertical sectional view, partly schemmatic, of a vessel and system for implementing this invention.
Figure 2:
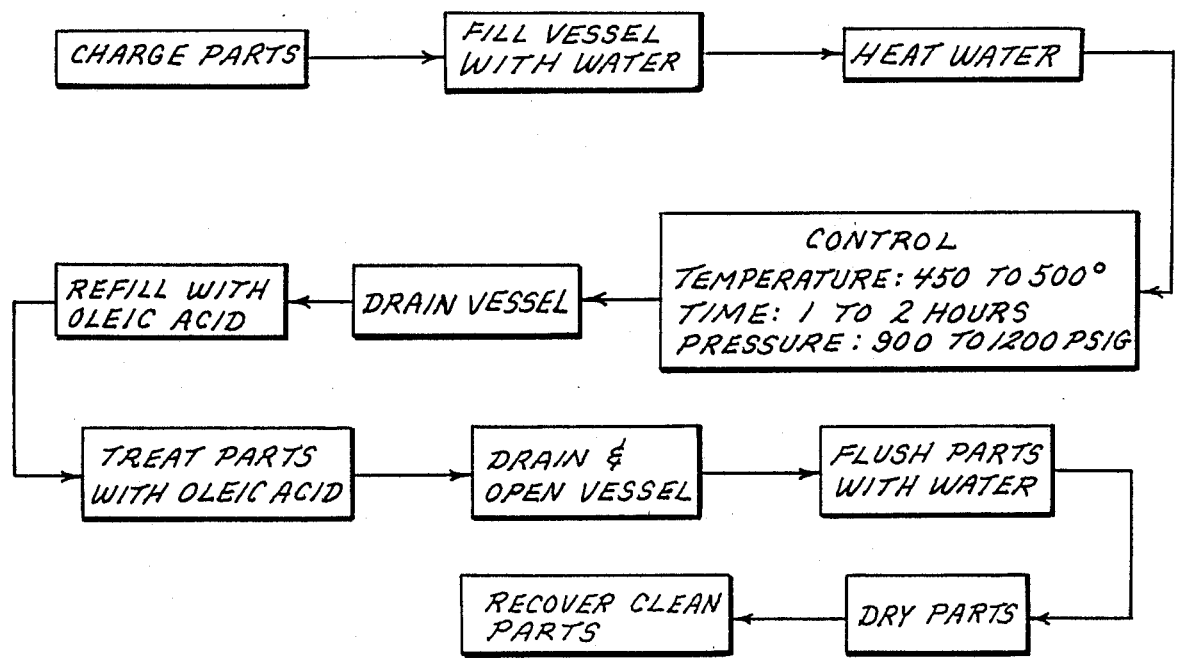
FIG. 2 is a schemmatic flow diagram of this invention.

FIG. 1 shows a pressure vessel 10 which has a bolted or other type of closure 11 for charging and removing objects or assemblies which are coated with baked-on grease or oil of any origin; the charge having a solid volume up to about 50% of the vessel volume, and each object or assembly being so positioned that pockets which can trap air or hinder complete fluid drainage are minimized. Some of the oil or grease may not be fully baked-on but it too will be removed by the process.

The vessel 10 has a fill and drain valve 12 and a vent and overflow valve 13 for filling the interior of the vessel 10 with water through the valve 12 as the air inside the vessel 10 is vented through the valve 13. The vessel 10 also is provided with suitable heating means 14 (shown as an internal immersion heater, but any suitable heat transfer apparatus and medium can be used).

The vessel 10 also is provided with a pressure gauge and relief valve 15 to control and measure the pressure inside the vessel 10. The maximum pressure in the vessel should be between about 700 and about 3000 psig. The preferred maximum pressure is about 1200 psig; this being a compromise between suppressing steam bubbles and more costly vessel construction.

A temperature gauge 16 is provided to facilitate operation. Suitable insulation 17 is provided around the outside of the vessel 10.

For animal or vegetable deposits the practical operating temperatures are between about 450° to about 550° F. and the preferred temperature is about 500° F. Higher temperatures may be required for some mineral oil deposits. The time the fluid is maintained at a temperature of about 450° to about 550° F. and a pressure of about 900 to about 1200 psig is about 10 to about 30 minutes. The most preferred time, temperature, pressure combination is about 15 minutes, about 500° F. and about 1000 psig.

The pressure in the process fluid, after filling and initiating heating, is readily controlled by first allowing about 15–20% of the fluid (including any not baked-on oil or grease which has been freed and floated upward) to escape via valve 13 as the temperature increases to about 400° F. and the fluid expands accordingly. Then, valve 13 is closed and the pressure in the fluid is thereafter controlled by varying the process fluid temperature rate of change. The rate of change is immaterial so long as the pressure does not exceed the working pressure of the vessel. The control of heat input to the system may be either manual or automatic and on-off or modulating in response to pressure in the fluid. When the temperature is at the desired end value as indicated by the gauge 16), heating is terminated.

After a few minutes without further heat input, the contents of the system are allowed to continue cooling by heat losses, or, if more rapid cooling is desired, by blowdown and/or other means, until the pressure is slightly above atmospheric. The system is then drained; the baked-on deposits now having been decomposed so that they may be treated with one or more of the greater variety of solvents than the few unusual ones which had an effect on the untreated baked-on deposits.

After the baked-on deposits are decomposed by the high temperature water treatment there are a number of solvents which will remove the normally black, glassy, and adhering residues from the objects being cleaned. A partial list includes benzene, xylene, and toluene. However, all of these are highly flammable and/or highly toxic.

There are other solvents which will remove the residues with less risk. Perchloroethylene, for example, is non-flammable and only moderately toxic. It is widely used for dry cleaning and degreasing of metal parts in industrial plants and is not injurious to the objects intended for cleaning by this invention. But, it is still less than the ideal solvent for this application because its vapors are toxic. Current Federal workplace regulations require that it not be present at more than 100 parts per million in air. Also, if distillation is used for solvent recovery, as would be expected for this application, regulations require that the still bottoms be treated as a hazardous waste, thereby complicating their disposal.

Another solvent, which is considered the best at this time, is oleic fatty acid. Although this solvent is about as flammable as vegetable oil it is only slightly toxic and has other attractive properties relative to this invention: neglible volatility, high boiling point, high flash point, practically insoluble in water, low specific gravity, freezing point below normal room temperatures, inhibits rust, and chemically similar to the decomposed baked-on deposits. It has a large capacity for dissolving the decomposed products and can be purified by re-distillation. When the term solvent is used hereinafter in this Detailed Description, oleic fatty acid is the selected solvent.

At this point the items being cleaned may either be treated with the selected solvent in situ or they may be removed to a separate vessel. Best economy may be the determining factor. Proceeding in situ conserves heat and labor. Continuing in another (atmospheric pressure) vessel frees the high pressure vessel for another charge.

If the continuing treatment is in situ, the vessel is filled with a selected solvent in the same manner as the filling with water. However, in this case the vent/overflow valve 13 may be left open if that is consistent with the nature of the solvent and any heating which may be used.

For the in situ case any heating of the selected solvent to increase solution rate is accomplished by the same means as those used for the hot water treatment. After a few minutes of the secondary treatment the vessel is drained and opened. Final cleaning of the charge may now be accomplished in situ or the charge may be removed to another area. Final cleaning may be a hot water or steam spray to flush off any undissolved solids (usually small flecks of carbon which did not leave with the drained solvent), a rust inhibitor spray if needed, and air drying.

If the in situ option is not selected, continuation of the cleaning processes in another vessel would be essentially the same as hereinbefore described.

The process has been described as a batch type but it can also be set up for continuous operation, if desired. However, currently economics are not good for a continuous process.

PREFERRED EXAMPLE

The following example describes the specifics of the process as it is used for cleaning pots, pans, stove burner trim rings, exhaust hood filter pads (metallic types), utensils, etc.

Equipment

The vessel 10 is 30" I.D. × 120" long and has a horizontal quick opening closure 11. It is designed for 1200 psig working pressure at 500° F. The 30" diameter is necessary so that the majority of restaurant exhaust hood grease filters (20"×20"×2") can be accommodated. About 50 filters Will fit in the 120" length.

There are three auxillary vessels (not shown). These are insulated, 500 gal. capacity tanks, one for warm water storage, one for solvent storage, and one for hot water (up to 500° F.) storage.

Pumps as needed are in the piping between the auxillary tanks and the main vessel 10.

There are three heat exchangers 14 of about 10 KW/ea/, mounted in piping not shown) external to the vessel 10 in order to maximize space for charges in the vessel 10. The piping is connected through the valves 12 and 13 to form a closed loop and a natural convection circuit. The heat exchangers 14 are at the bottom of loop and adjacent to the valve 12 so as to promote natural convection flows of fluids. Another heat exchanger (not shown) may be in the riser portion of the piping for heating or cooling as desired.

Ancillary systems (not shown) are provided in the system as needed for decanting freed grease or oil, separating solids from drained fluids, water clarification, solvent recovery, etc.

To charge the vessel 10 the closure 11 for the vessel 10 is opened. A charge consisting of a mixture of the noted types of items is placed into the vessel 10. With these types of items there is little chance that they can be packed so closely together as to exceed the previously stated limitation of the charge solid volume being no more than 50% of the vessel volume. Therefore, they should be packed as closely together as possible. Placement is facilitated by a wheeled rack, thereby permitting the charge to be assembled outside the vessel and then rolled into the vessel. The items in the charge are so placed and supported by the rack and by each other that they minimize inverted pockets which would trap air or other gases and also minimize upright pockets which would trap liquids and prevent their drainage, i.e., a cooking pot would be positioned so that its bottom surface would be approximately vertical. After the charge is in place the vessel is closed and sealed at the closure 18. Charging time is about 15 minutes.

The vessel 10 then is filled with warm water, conserved from a previous cycle by storing it in an insulated vessel (not shown). Transfer of the water to the vessel 10 is via a pump (not shown) and the fill/drain valve 12. Filling is continued until there is a solid stream of water leaving via the vent/overflow valve 13, thereby indicating that practically all of the air that was in the vessel has been replaced by water. Pumping is stopped and stored hot water (about 400° F.) is admitted through the valve 13 to displace the warm water back to storage through the valve 12; the saturation pressure of the hot water serving as the driving force. Further heating of the charge is initiated by the exchangers 14.

As heating progresses, in this example under manual control, the temperature and pressure as indicated by the gauges 15 and 16 are frequently observed so that the temperature does not exceed 400° F. and the pressure is not less than 125% of the saturation pressure corresponding to the indicated temperature, nor more than 1000 psig. This control is accomplished by throttling the valve 13; the amount of overflow through it being approximately the volume increase of the fluid due to its expansion. When the temperature reaches 400° F., the valve 13 is closed, the heating is continued under on-off control of the heat exchangers 14, such that the pressure does not go below 125% of the saturation pressure corresponding to the indicated temperature nor over 1000 psig. The heating by the heat exchangers 14 should be used as much as possible so that 500° F. is achieved without unnecessary delay. When the temperature at the gauge 16 reaches 500° F., in about 1 hour depending on the heating capacity of exchangers 14 and heat losses, heating is stopped and soaking of the charge at the elevated temperature is allowed to continue for about 15 minutes.

To drain the vessel 10, hot water is displaced back to hot water storage by a high pressure pump delivering warm water to the vessel 10 through the valve 12; this operation takes about 1 hour. The warm water in the vessel 10 is then drained through the valve 12, with the vent 13 open, and pumped to warm water storage. About 15 minutes is used for draining.

The charge is then solvent treated with oleic fatty acid, the preferred solvent at this time. The oleic acid is pumped into the vessel 10 through the valve 12 until a solid stream of fluid exits through the vent 13. With the overflow valve 13 open, heating of the solvent to about 350° F. is provided by energizing the exchangers 14. Heating is stopped after about 15 minutes at 350° F., as indicated by the gauge 16. Draining is initiated by pumping fluid from the vessel 10 through the valve 12 and back to solvent storage, which takes about 15 minutes.

To finish the parts, the vessel closure 11 is opened and clean hot water at about 160° F. is immediately sprayed by hand held hose onto the charge items, covering the surfaces of the items in view as much as possible. One effect of the spray is to cool the charge, another is to flush off solids which did not drain along with the solvent. The rack is then partially withdrawn from the vessel 10 and hot water spraying continued on those items still inside but now more open to view. The process is repeated until the rack is clear of the vessel 10. The charge is now at about 150° F. and the rack is moved to an air drying area where sprayed on rust preventative is applied as needed and air drying is completed. The rack is then emptied, returned for another cycle, and the items are moved to storage. Finishing time is about 10 minutes.

One cycle of operation takes about 3-4 hours.

Ancillary Operations

Pot and pan handles which would be damaged by cleaning operations are removed before cleaning and later matched with and reassembled to pieces.

Solvent recovery is accomplished on a continuous basis; grease and oil being collected for sale to rendering plants, and solid wastes are collected for disposal as waste.

Separation of water and solvent is by batch decanting from storage vessels.

This invention is intended to cover all changes and modifications of the example of the invention herein chosen for purposes of the disclosure which do not constitute departures from the spirit and scope of the invention.

What is claimed is:

1. A method of removing oil and/or grease from a part having a baked-on oil and/or grease deposit thereon, comprising the steps of causing substantially the entire surface of the part to be in intimate contact with water within a pressure vessel, heating the water in the vessel to a temperature of at least about 450° F. and under sufficient pressure to prevent boiling of the water for a period of time sufficient to decompose the deposit and convert the deposit into a composition which can be removed by a low hazard solvent, causing the part to be out of contact with said water, subsequently causing substantially the entire surface of the part to be in intimate contact with a low hazard solvent for a sufficient time to dissolve the decomposed composition, and then causing the part to be out of contact with said solvent.

2. The process of claim 1 wherein the temperature is about 450° to about 550° F. and the pressure is about 900 to about 1200 psig.

3. The process of claim 2 wherein the time the substrate is treated is about 60 to about 90 minutes.

4. The process of claim 1 wherein the solvent is oleic acid.

5. The process of claim 1 wherein the temperature of said solvent is about 300° to about 350° F. and the pressure thereof is about atmospheric.

6. The process of claim 5 wherein the part is treated for about 30 to about 60 minutes.

* * * * *